United States Patent
Carson et al.

[11] Patent Number: 5,857,487
[45] Date of Patent: Jan. 12, 1999

[54] AUTOMATIC WATER SHUT OFF VALVE

[76] Inventors: Scott R. Carson, P.O. Box 600, Logandale, Nev. 89021; Michael A. Teliska, 1325 Olvera Way, Las Vegas, Nev. 89128

[21] Appl. No.: 595,661

[22] Filed: Feb. 2, 1996

[51] Int. Cl.⁶ .................................................. F16K 17/28
[52] U.S. Cl. ................... 137/519; 239/200; 239/533.15; 239/570
[58] Field of Search .................................... 137/519, 498; 239/200, 533.15, 570

[56] References Cited

U.S. PATENT DOCUMENTS

| | | |
|---|---|---|
| 2,860,659 | 11/1958 | Carlson et al. . |
| 3,586,019 | 6/1971 | Thomas . |
| 4,128,105 | 12/1978 | Follett .................................. 137/519 X |
| 4,361,280 | 11/1982 | Rosenberg . |
| 4,393,992 | 7/1983 | Strunk et al. ............................ 239/200 |
| 4,562,962 | 1/1986 | Hartman . |
| 4,842,198 | 6/1989 | Chang . |
| 4,848,661 | 7/1989 | Palmer et al. . |
| 4,852,602 | 8/1989 | McKinnon . |
| 4,867,603 | 9/1989 | Chang . |
| 5,465,752 | 11/1995 | Higgins .......................... 239/533.15 X |

*Primary Examiner*—Stephen M. Hepperle
*Attorney, Agent, or Firm*—Quirk & Tratos

[57] ABSTRACT

A valve is formed by an intersection of an open ended water supply pipe and a sprinkler outlet pipe. The outlet pipe has a closed end and an outlet end that is adapted for connection to a sprinkler. A cylindrical guide post connected to the closed end extends through the intersection to a proximal portion of the outlet end. A guide assembly is slidably disposed over the guide post. In response to an excessive flow of water through the outlet end, the guide assembly is drawn through the intersection to occlude the outlet end.

12 Claims, 1 Drawing Sheet

AUTOMATIC WATER SHUT OFF VALVE

BACKGROUND OF THE INVENTION

1. Field of Invention

This invention is in the general field of water flow regulating systems and, more particularly, is a valve that automatically shuts off an excessive flow of water through an outlet.

2. Description of the Prior Art

In much of the United States, an automatic sprinkler system is probably the easiest way to irrigate the landscape of a suburban home, for example. The sprinkler system is usually of a type where water from a source is carried by a main water supply pipe that is connected to a plurality of sprinklers that are respectively connected to a plurality of risers. A riser elevates a sprinkler in response to water being provided through the supply pipe.

The sprinkler provides a flow of water therefrom that is usually limited by the design of the sprinkler. However, when the sprinkler breaks, the flow of water to the broken sprinkler is limited mainly by the capability of the source to supply the water. Therefore, the broken sprinkler increases the probability of local flooding. Additionally, the flow of water from the broken sprinkler causes unbroken ones of the plurality of sprinklers to provide insufficient water, thereby causing damage to vegetation.

It is desirable to monitor the sprinkler system to locate the broken sprinkler as soon as possible and thereby minimize the local flooding and the damage to the vegetation. The cost of monitoring the sprinkler system, the local flooding and the damage to the vegetation are factors that often make the sprinkler system impractical. The sprinkler system would be more practical if there was a reliable, inexpensive device that automatically shuts off a flow of water to the broken sprinkler.

SUMMARY OF THE INVENTION

An object of the present invention is to shut off a flow of water to a broken sprinkler of an automatic sprinkler system.

According to the present invention, there is an intersection of an open ended supply pipe and an outlet pipe that has an outlet end and a closed end. A guide post extends from the closed end, through the intersection, to a proximal portion of the outlet end. A guide assembly fits slidably over the guide post. The guide assembly is positioned on the guide post to occlude the outlet pipe in response to a flow of water therethrough being greater than a desired flow of water.

A valve in accordance with the present invention provides a simple, reliable and economic way of shutting off an excessive flow of water through a broken sprinkler of an automatic sprinkler system.

Other objects, features, and advantages of the invention should be apparent from the following description of embodiment thereof as illustrated in the accompanying drawing.

DESCRIPTION OF THE EMBODIMENTS

A sprinkler of an automatic sprinkler system is usually connected to a sprinkler outlet of the system. When the sprinkler breaks, there is an excessive flow of water and a rapid reduction of water pressure at the sprinkler outlet. The present invention utilizes the rapid reduction of the water pressure to shut off the flow of water.

Figure 1:
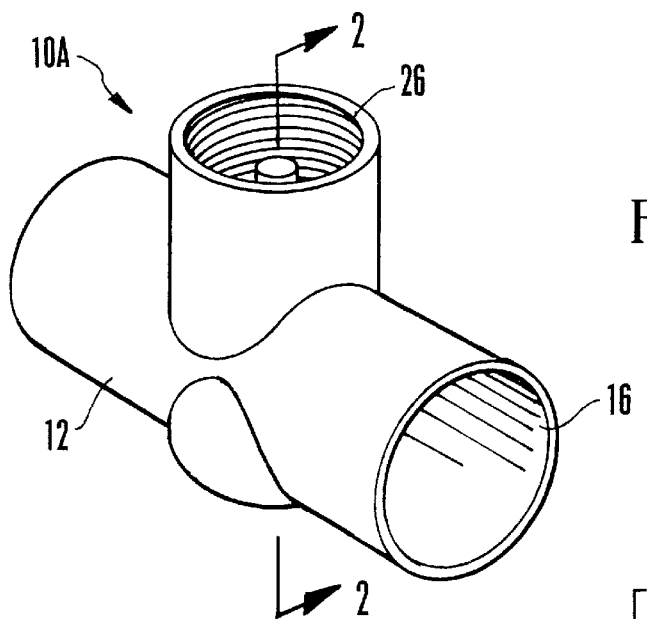
FIG. 1 is a perspective view of a first embodiment of the present invention.
Figure 2:
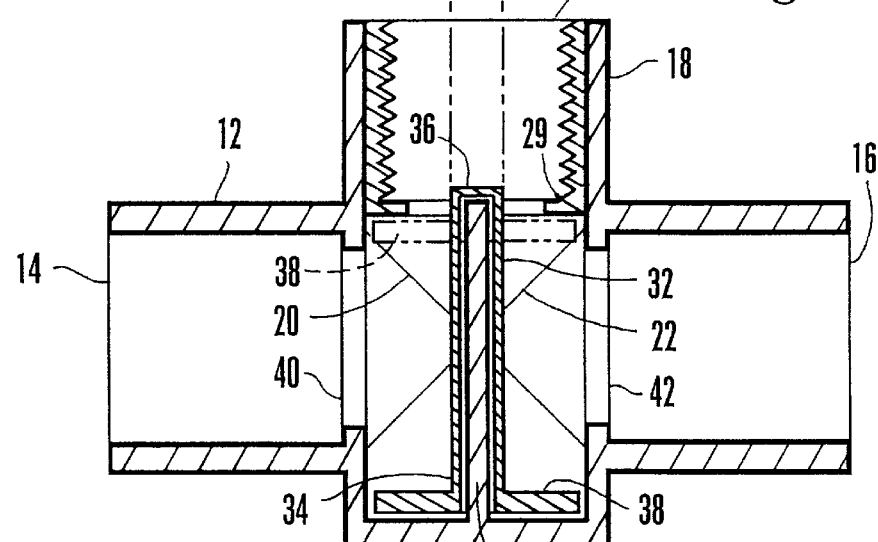
FIG. 2 is a view of FIG. 1 taken along the line 2—2.

As shown in FIGS. 1 and 2, in a first embodiment of the invention, a tee shaped valve 10A includes a water supply pipe 12 that has open ends 14, 16. The end 14 is connected to a source of water (not shown).

The pipe 12 is integrally connected to a sprinkler outlet pipe 18 at a right angle intersection therewith. The intersection of the pipes 12, 18 is along intersection lines 20, 22. Preferably, the pipes 12, 18 are made from polyvinyl chloride (pvc).

In this embodiment, the pipes 12, 18 have substantially the same diameter. In an alternative embodiment, a water supply pipe and a sprinkler outlet pipe may have respective diameters that differ from each other.

The pipe 18 has an internally threaded open end 26 that is adapted for connection to a sprinkler (not shown). Additionally, the pipe 18 has a closed end 28. A proximal portion of the interior of the end 26 includes a circumferential lip 29. The use of the lip 29 is explained hereinafter.

A cylindrical guide post 30, within the pipe 18, is integrally connected to the end 28 near its center. Moreover, the guide post 30 is perpendicular to the end 28 and extends through the intersection to a proximal portion of the interior of the end 26.

A cylindrical guide tube 32 that has an open end 34 and a closed end 36 is slidably disposed over the guide post 30. Preferably, the guide tube 32 is made from pvc.

The open end 34 is coaxially connected to a brass washer 38. Preferably, the connection between the open end 34 and the washer 38 is a watertight seal. The guide tube 32 and the washer 38 form a guide assembly.

When the guide assembly is positioned with the washer 38 adjacent to the end 28, the end 26 is unoccluded and water flows therethrough, whereby the valve 10A is said to be open. It should be understood that the water pressure at the end 26 is inversely related to the flow rate of the water.

In response to the flow rate being greater than a desired flow rate, a reduced water pressure causes the guide assembly to be drawn through the intersection to a position where the washer 38 is in an abutting relationship with the lip 29. When the washer 38 and the lip 29 are in the abutting relationship, the end 26 is occluded and water cannot flow therethrough whereby the valve 10A is said to be closed. When the valve 10 is closed, the guide tube 32 and the washer 38 are in a position shown by broken lines.

The washer 38 is selected to cause the guide assembly to be of sufficient weight to prevent an occlusion of the end 26 during an initial inrush through the pipe 12 when the water is first turned on. The weight does not prevent the occlusion of the end 26 when the sprinkler breaks.

In an alternative embodiment, the guide assembly is comprised of a brass washer that is connected to a plurality of standoffs. The standoffs prevent the washer from coming to rest upon the end 28.

In an exemplary construction of the valve 10A, the pipes 12, 18 have a 1 1/16 inch inside diameter and the washer has a 1 inch diameter. The outside diameter of the guide tube is 1/4 inch.

The end 14 includes an internal circumferential lip 40 adjacent to the intersection. In the exemplary construction, the lip 40 has an inside diameter of 3/4 inch. When, for example, a pvc water supply pipe (not shown) with an outside diameter of 1 inch is inserted into the end 14, the lip 40 prevents the water supply pipe from entering the intersection.

The end 16 includes an internal circumferential lip 42, similar to the lip 40, adjacent to the intersection. When it is desired to connect an appliance to the water supply, it may be connected via a pvc pipe (not shown) inserted into the end 16. The lip 42 prevents the connecting pipe from entering the intersection. When the connection of the appliance to the water supply is not desired, a plug is inserted into the end 16.

Figure 3:
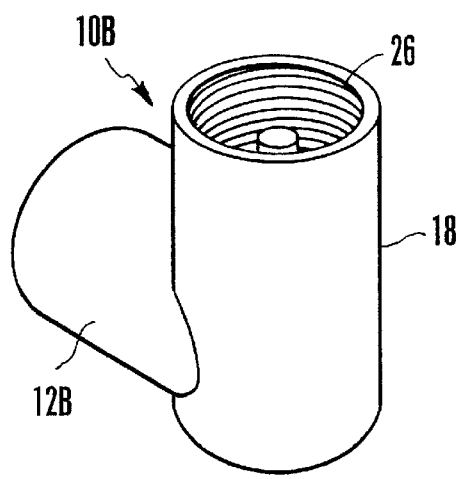
FIG. 3 is a perspective view of a second embodiment of the present invention.

As shown in FIG. 3, in a second embodiment of the invention, an elbow shaped valve 10B includes a pvc water supply pipe 12B that intersects the pipe 18 at right angles. The intersection forms an entry port for water from the water source.

All water from the water source passes through the end 26 to the sprinkler. The second embodiment includes a guide assembly and a guide post similar to that described in connection with the first embodiment. The second embodiment obviates the plug of the first embodiment.

While the invention has been particularly shown and described with reference to embodiments thereof, it should be understood by those skilled in the art that changes in form and detail may be made therein without departing from the spirit and scope of the invention.

I claim:

1. A valve for preventing an excessive flow of water through an outlet pipe that has an outlet end adapted for connection to a sprinkler and a closed end, comprising:

a water supply pipe that is integrally connected to said outlet pipe to form an intersection;

a guide post that is connected to said outlet pipe, said guide post extending through said intersection to a proximal portion of said outlet end; and a guide assembly that fits slidably over said post, said guide assembly being positioned on said guide post to occlude said outlet pipe in response to a flow rate of said water being greater than a desired flow rate.

2. The valve of claim 1 wherein said pipes intersect each other at right angles to cause the valve to be in the shape of a tee.

3. The valve of claim 1 wherein said pipes intersect each other at right angles to cause the valve to be in the shape of an elbow.

4. The valve of claim 1 wherein said post is cylindrical and is perpendicularly connected to said closed end.

5. The valve of claim 1 wherein said pipes are made from polyvinyl chloride.

6. The valve of claim 1 wherein said pipes have substantially equal diameters.

7. The apparatus of claim 1 wherein said supply pipe has a circumferential lip therein.

8. The valve of claim 1 wherein said outlet end is occluded by said guide assembly in response to said flow rate being greater than said desired flow rate.

9. The valve of claim 1 wherein said proximal portion of said outlet end has a circumferential lip, said guide assembly comprising a washer.

10. The apparatus of claim 8 wherein said proximal portion of said outlet end has a circumferential lip, said guide assembly comprising:

a cylindrical tube that is closed at one end and open at the other end; and a washer that is coaxially connected to the open end of said tube, said washer being drawn through said intersection into an abutting relationship with said lip in response to said flow rate being greater than said desired flow rate.

11. The valve of claim 10 wherein said washer is made from brass.

12. The apparatus of claim 10 wherein said guide tube is made from polyvinyl chloride.

\* \* \* \* \*